UNITED STATES PATENT OFFICE.

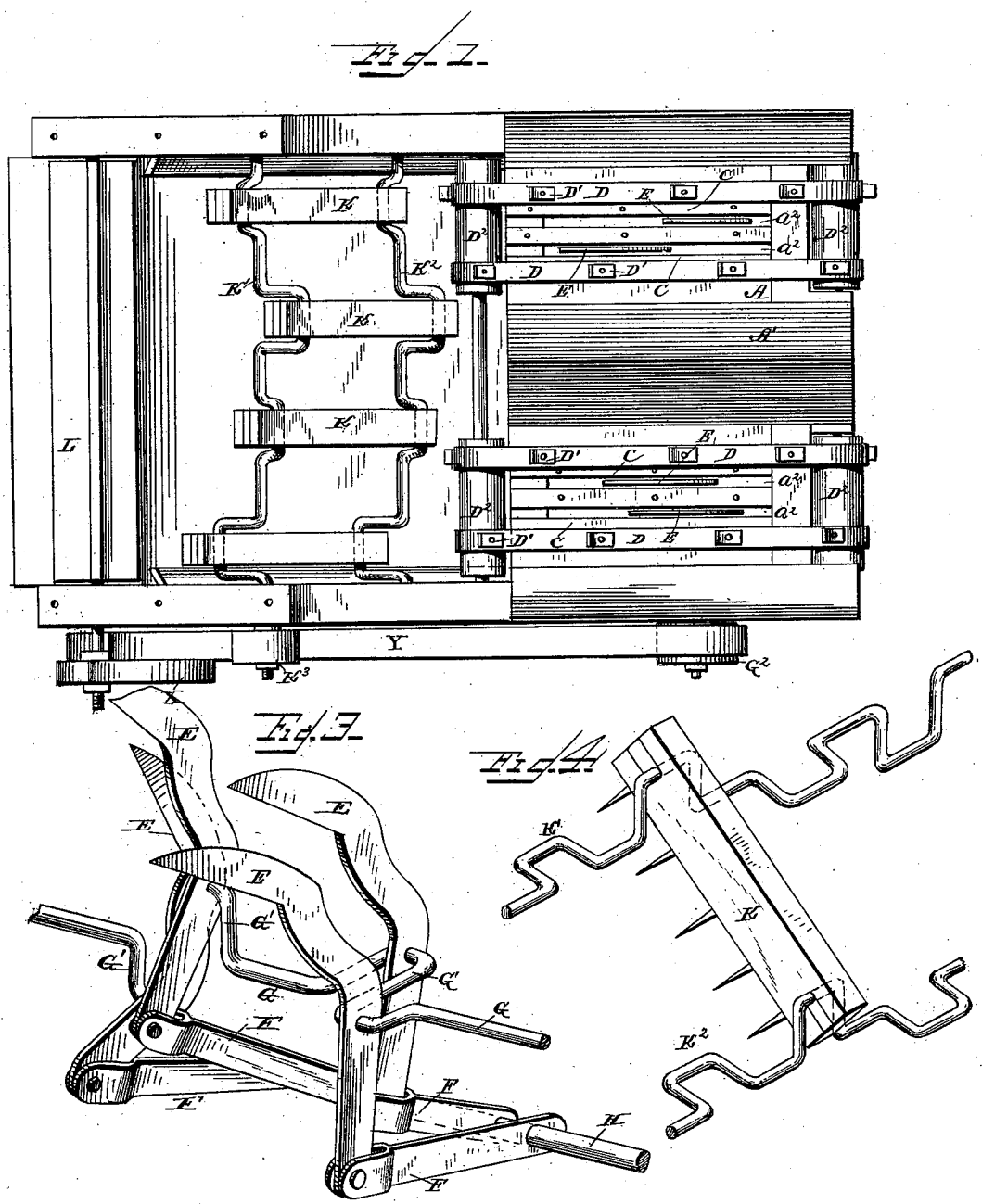

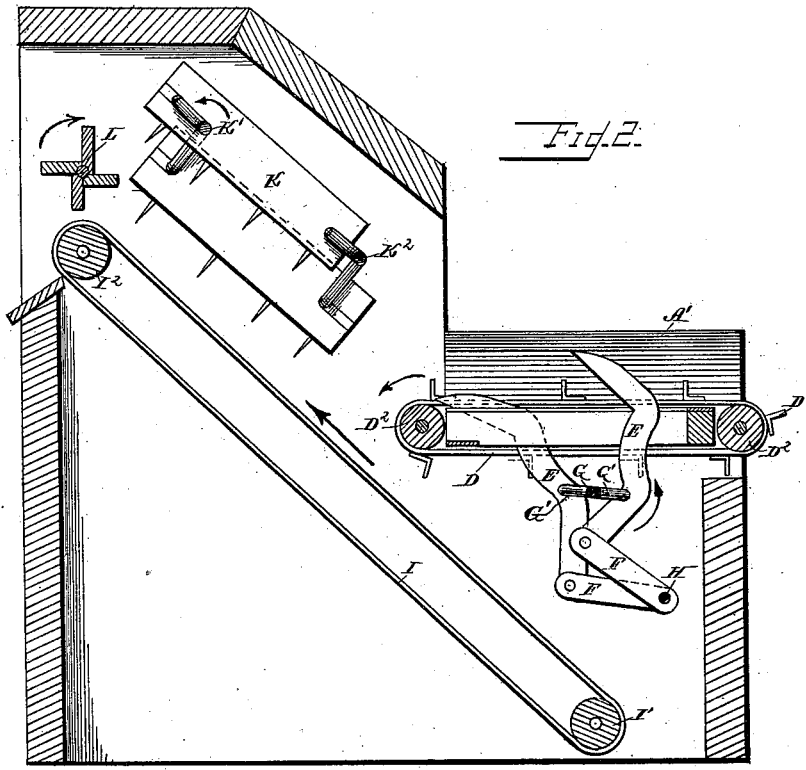
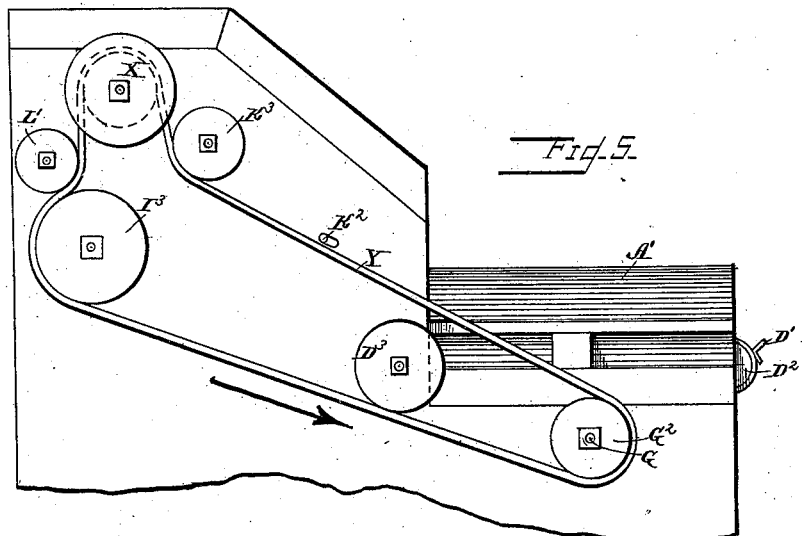

FRANKLIN P. POTTS, OF FORT COLLINS, COLORADO.

BAND-CUTTER AND FEEDER.

SPECIFICATION forming part of Letters Patent No. 361,235, dated April 12, 1887.

Application filed February 1, 1886. Serial No. 190,415. (No model.)

*To all whom it may concern:*

Be it known that I, FRANKLIN P. POTTS, a citizen of the United States, residing at Fort Collins, in the county of Larimer, State of Colorado, have invented certain new and useful Improvements in Band-Cutters and Feeders, of which the following is a specification, reference being had therein to the accompanying drawings.

My invention relates to band-cutters and feeders, and has for its objects to cut the bands of the sheaves and increase the capacity for work without necessitating an increase of motor-power. I accomplish these objects by means of the mechanism illustrated in the accompanying drawings, in which—

Figure 1 is a plan view of a machine embodying my invention. Fig. 2 is a longitudinal section of the same. Fig. 3 is a detail of the knife mechanism. Fig. 4 is a detail of one of the bars of the distributer and its crank-shafts. Fig. 5 is a side view showing the gearing.

A is the feeding-table, divided by the inclined partition A' into two compartments, whereby two bundles can be fed at once. This table has two longitudinal and parallel slots, $a^2 a^2$, in each compartment, in which the knives operate. Extending over the edges of these slots $a^2$ are ledger-blades C C. At the outer side of each pair of these slots are endless bands D D, provided with the hooks D' D', for the purpose hereinafter set forth, and passing around drums $D^2 D^2$ at either end. Operating up through these slots $a^2 a^2$ are the hook-curved knives E E. These knives are pivotally attached to the ends of the links F F and loosely engage the crank portions G' of the shaft G, and are operated by the same. These crank portions G' are double, and the members of each pair extend in opposite directions, and each pair of the cranks G' extends in a diametrically-opposite direction to the other. At the end of the shaft G is a pulley, $G^2$, which forms one of the series of pulleys shown in Fig. 5 of the drawings. The links F F are pivotally attached to a stationary shaft, H. Extending under this feeding-table and upward at an incline to the rear of the machine is an elevator-belt, I, which passes around drums upon shafts I' and $I^2$. Poised over and having the same incline as the elevator-belt I is the distributer K, which consists of a series of parallel bars, the lower edges of which are provided with small pins, and the ends are journaled upon corresponding crank-shafts, K' $K^2$. These crank-shafts are formed with cranks, each one of which is at an angle of ninety degrees with its neighbor. This distributer just touches or comes in close proximity to the elevator-belt I when the machine is in operation.

At the upper end of the elevator-belt is a beater, L, provided with a small pulley outside the casing of the machine.

The pulley $G^2$, attached to the shaft G and operating the knives E E; the pulley $D^3$, attached to one of the drums $D^2$ and operating the endless bands D D; the pulley $K^3$, attached to crank-shaft K' and operating distributer K; the pulley L', attached to and operating the beater L; the pulley $I^3$, attached to shaft $I^2$ and operating elevator-belt I, and the idler X form the series of pulleys which are engaged and driven by the band Y and operate the machine, as shown in the drawings. The idler X has two bearing-surfaces, one of which is smaller than the other. The band Y in passing bears against the smaller surface, while a band leading from the thrasher to which this machine is attached engages the larger surface.

The sheaves are fed upon my band-cutter two at a time, one into each compartment. The knives are so adjusted that only one knife will cut at a time, thus relieving the strain upon the crank-shaft. This is accomplished by placing the pairs of cranks upon the said shaft in opposite planes. When the sheaves are placed upon the feeding-table A, the hooks D' upon the bands D grasp and carry them forward and deposit them upon the elevator-belt I. In the passage of the sheaves the knives E E rise on their shafts and pass over the bands, which are cut between the knives and the ledger-blades C C in the downward motion of the knives, the knives being thrown upward with the points of the blades up, and drawn down with the points of the blades down, by means of the cranks and the knee-joints formed by the links F.

The cut sheaves are carried up the elevator-belt I in a more or less compact form until they reach the distributer K. This distributer K is operated at a rapid rate of speed and in the same direction as the elevator-belt I. As each successive bar falls upon the sheaf, the small pins engage and distribute the sheaf across the elevator-belt I, and the distributed grain-bearing stalks are carried forward and over the end of the elevator-belt and fed to the thrasher. As it passes over the end of the elevator-belt the beater L further distributes it and prevents it adhering to the elevator-belt I.

While I have described and illustrated a complete band-cutter and feeder, I make no claim to the feeding devices, but only to the cutting mechanism and its adjuncts, the feeding devices being merely shown and described in order to disclose the construction and relative arrangement of my improvements with respect thereto.

I claim—

1. In a band-cutter and feeder, the combination of a slotted feeding-table, cutting-blades, substantially as described, a driving-shaft loosely engaging said cutting-blades and provided with a pulley, a stationary shaft, and a link pivotally attached to each of said blades and to the stationary shaft, substantially as set forth.

2. In a band-cutter and feeder, the combination of a slotted feeding-table having two compartments, two sets of cutting-blades, substantially as described, a crank-shaft engaging said blades by means of cranks arranged in pairs, each pair extending in an opposite plane to the other, a stationary shaft, and links pivotally attached to each of said blades and to the stationary shaft, substantially as set forth.

In testimony whereof I affix my signature in presence of two witnesses.

FRANKLIN P. POTTS.

Witnesses:
E. P. DUNNING,
EDWD. H. HALL.